Figure 3:
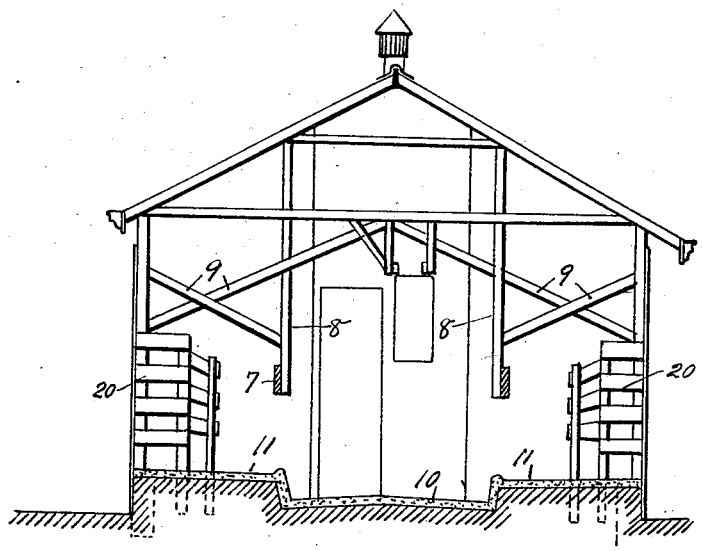

W. L. BOYCE.
INCLOSURE OR BUILDING FOR THE MILKING OF COWS AND THE BRANDING OF CATTLE.
APPLICATION FILED MAY 4, 1911.
1,043,293.
Patented Nov. 5, 1912.
4 SHEETS—SHEET 1.
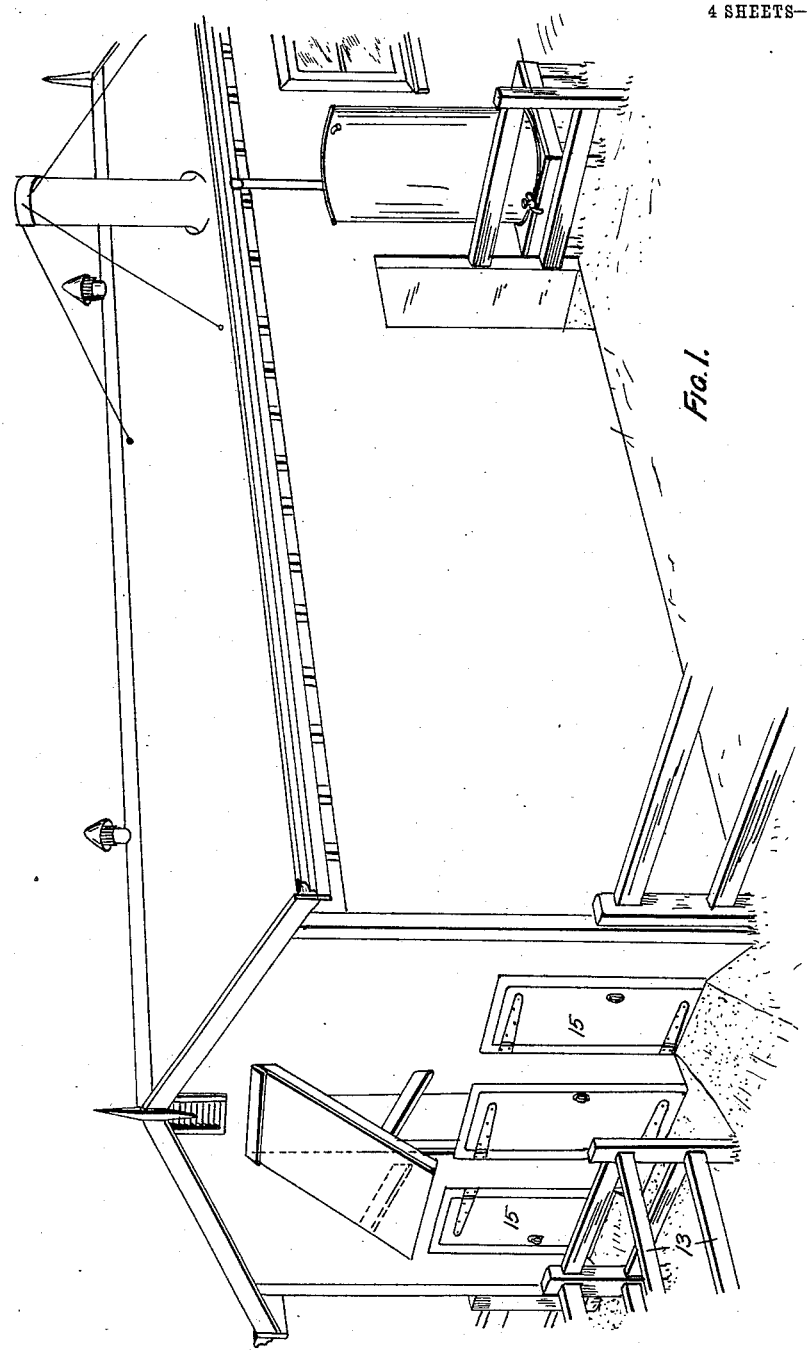

W. L. BOYCE.
INCLOSURE OR BUILDING FOR THE MILKING OF COWS AND THE BRANDING OF CATTLE.
APPLICATION FILED MAY 4, 1911.
1,043,293.
Patented Nov. 5, 1912.
4 SHEETS—SHEET 2.
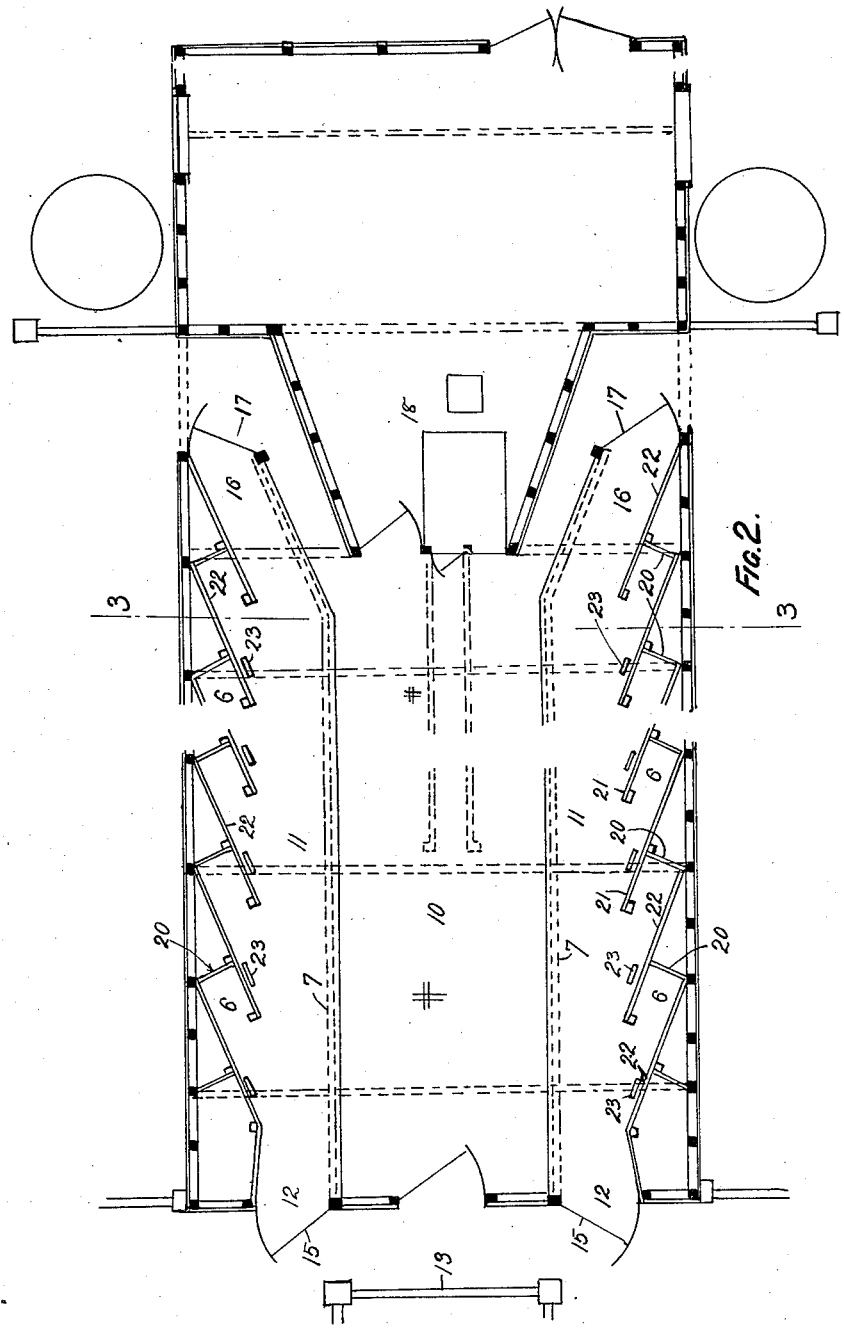
WITNESSES:
INVENTOR:
ATTY.

W. L. BOYCE.
INCLOSURE OR BUILDING FOR THE MILKING OF COWS AND THE BRANDING OF CATTLE.
APPLICATION FILED MAY 4, 1911.

1,043,293.

Patented Nov. 5, 1912.

4 SHEETS—SHEET 3.

W. L. BOYCE.
INCLOSURE OR BUILDING FOR THE MILKING OF COWS AND THE BRANDING OF CATTLE.
APPLICATION FILED MAY 4, 1911.

1,043,293.

Patented Nov. 5, 1912.

4 SHEETS—SHEET 4.

WITNESSES:

INVENTOR:
William Livingstone Boyce
BY
ATTY.

UNITED STATES PATENT OFFICE.

WILLIAM LIVINGSTONE BOYCE, OF EULABIL, NEAR CASINO, NEW SOUTH WALES, AUSTRALIA.

INCLOSURE OR BUILDING FOR THE MILKING OF COWS AND THE BRANDING OF CATTLE.

1,043,293.  Specification of Letters Patent.  Patented Nov. 5, 1912.

Application filed May 4, 1911. Serial No. 625,092.

*To all whom it may concern:*

Be it known that I, WILLIAM LIVINGSTONE BOYCE, a subject of the King of Great Britain, residing at Eulabil, near Casino, in the State of New South Wales and Commonwealth of Australia, have invented a new and useful Improvement in and Relating to Inclosures or Buildings for the Milking of Cows and the Branding of Cattle, of which the following is a specification.

This invention refers to inclosures or buildings or sheds or the like wherein cows may be assembled for milking either by hand or as now generally by machinery and while so adapted for easy milking the inclosure or building might with advantage be used for the purposes of assembling cattle for branding. And this invention relates primarily to novel constructions of series of stalls or standing places for the cows so that such animals may be quickly ranged side by side and at the same time quite accessible for milking or for branding and be quickly allowed to escape. And this invention relates further to combinations with the said novel constructions of stalls of essentials for milking by hand or machinery.

An improved inclosure or shed for the milking of cows or the branding of cattle according to this invention comprises a series of half-stalls ranged in echelon diagonally along one side or both sides of a passage way from which said series of half-stalls are railed off leaving the half-stalls clear to receive the head and forward part of the animals. These half-stalls have their short sides to the front and their long sides to the rear. In front of each long side is a vertical spring board or other device for imparting pressure which is arranged to press the animal diagonally forward with its head inside the front short side. Exit passages with gates which are also used as stalls are arranged at the foremost stall, part of the backward side of each of which passages forms the short side of the first half-stall to take the second cow. Wings are arranged at the rear to guide the animals to the entrance gates or the stalls way. The floor of the stalls is at a higher level than the floor of the central passage so that less stooping is necessary to reach the cow's udder and that comfortable seats for attendants while milking may be placed on the latter while when stripping the rounded edge of the raised floor provides a knee abutment and proper drainage of the floors is provided. It is preferred that the short sides of the half-stalls should be higher than the long sides and be multiple railed while the latter is simply a single low rail. Milking machines may be arranged in the central passage way and devices for transporting the milk receptacles to the separating or other chamber or inclosure which inclosure conveniently might intrude in the angle formed by the foremost diagonal stalls and exit passage. The angle at which these diagonal echelon half-stalls are set to the passage way may vary but it is found that an angle say of from twenty to thirty degrees answers admirably. Of course the stalls might range along one side only of the building or inclosure in which case what is herein termed the central passage way would be a passage along the other side of the building or inclosure but in every other respect the arrangement would be the same as with the two lines of stalls. But in order that a practical application of this invention may be easily carried into effect the same will now be described with reference to the drawings accompanying and forming part of this complete specification.

Figures 4, 5:
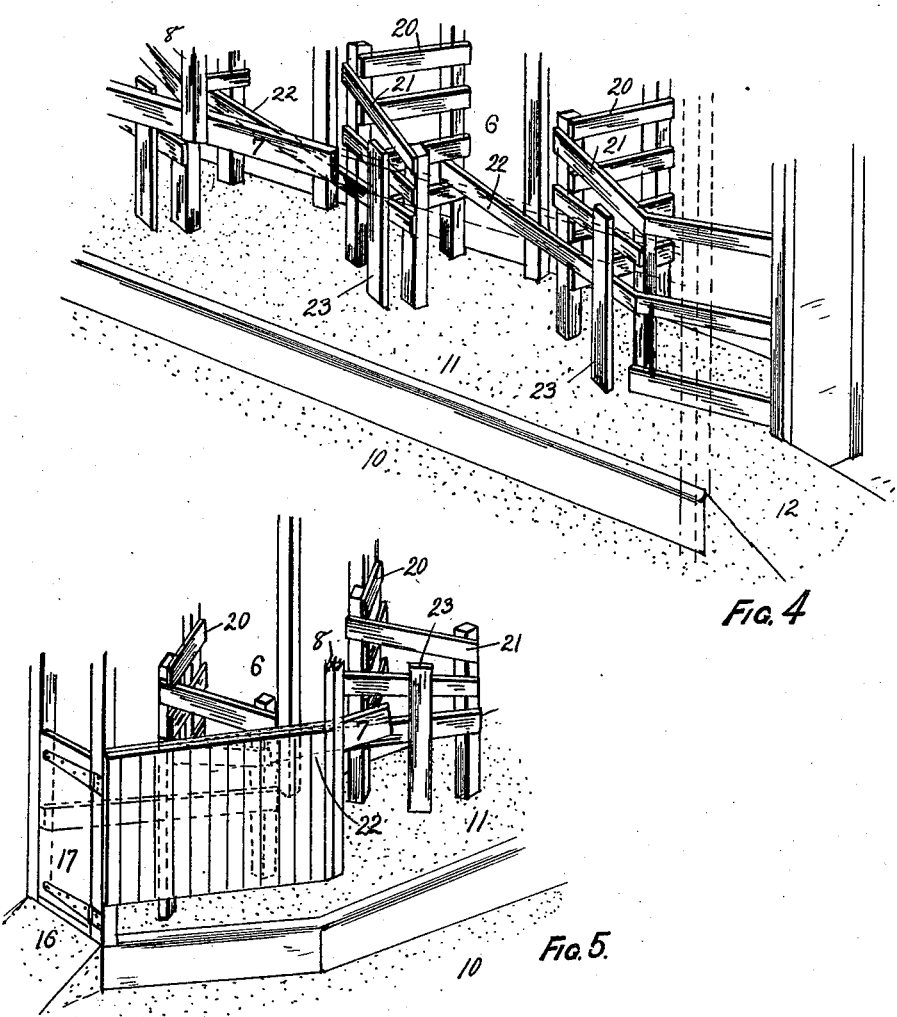

Figure 1 is a perspective view of milking building or inclosure constructed according to this invention and Fig. 2 is a plan of the same, Fig. 3 is a cross-section on the line 3 3 in Fig. 2 while Figs. 4 and 5 are perspective views of the after and forward ends respectively of the stall ways.

In a shed or building of ordinary construction as shown the half-stalls 6 are built against the side walls in echelon and they are railed off by a bar or rail 7 (though there may be more than one such rail) preferably supported by vertical posts 8 and braces 9 from above and thus leave a central or working way 10 for the workers and for the milking machines. The floor of this way 10 is below the level of the floors of the stall ways 11 and allows of comfortable seating for the workers. These floors also have desirable inclinations as shown to provide efficient drainage.

The entrance or after end 12 of the building has rearwardly of it the railed inclosure 13 to act as wings to direct the animals to the entrance gates 15 which when they are open close up against such wings leaving the stall ways unbarred as shown in Fig. 4. Instead of the inclosure 13 there may be two yards at this end of the building a gate in the dividing fence thereof acting in conjunction with gates 15 guiding the animals to the desired side of the building. The exit or forward end 16 of the building has gates 17 which when open give free exit to first animals and the passage being thus cleared the next cows are enabled to lift their heads over the short sides 21 of the half-stalls and pass out and so on with the animals in succession.

In the working way 10 rails may be laid for trucks on which the filled milk cans are run into the creamery 18 which is an independent structure as shown intruding into the angle of the milking shed arising from the diagonal set of the stalls. In this way 10 also are the machines and other necessary appliances as well understood for milking by hand or machinery. Now each stall or half-stall 6 has a front end 20 a short side 21 a long side 22 and in front of the latter a spring board 23. And these half-stalls 6 are set in continuous series diagonally or in echelon along the side walls of the building as shown and so economize the space to be occupied by the cows and constitute a good hold for the same in most convenient position for milking.

In use the animals in number one more than the number of half-stalls 6 are driven to the entrance gates 15 and entering the stall ways 11 fall naturally into position with one in the exit passage 16 and the others with their foreparts in the half-stalls 6 and pressing against the spring board 23 with their heads free to pass over the dividing rails or long side 22 of the stall clear of the animals in next stalls. The position of each animal now is that its rump is well over toward the bar or rail 7 with its udder close under that rail and within easy and convenient reach of the milking machine and of the workers for stripping or for hand milking. When the batch of cows have been milked, the gates 17 are opened and the cows depart therethrough while others enter through gates 15. When the inclosure is used for the branding of cattle it would be as well to dispense with the spring boards 23 or pressure devices and to increase and strengthen the guard rails 7, but in other respects no alteration is desirable.

Having now fully described and ascertained my said invention and the manner in which it is to be performed I declare that what I claim is:—

1. In inclosures or buildings for the milking of cows and the branding of cattle, a series of fixed stalls or half stalls constructed diagonally and in echelon along one of the walls or boundaries thereof, said inclosure or building being provided with an entrance gate and an exit gate for the cows, said series of stalls being so positioned that their openings face in the direction of the entrance gate, substantially as herein described and explained.

2. In inclosures or buildings for the milking of cows or the branding of cattle, two series of fixed stalls or half stalls constructed diagonally and in echelon, a separate stallway provided for each of said series of stalls or half stalls, a central working space between said stallways and divided therefrom, and entrance and exit gates associated with each stallway, whereby the cows may pass into and out from said stallways, the openings of the stalls of each series facing in the direction of the entrance gate leading into the stallway communicating with such series.

3. In inclosures or buildings for the milking of cows or the branding of cattle, two series of stalls or half stalls constructed diagonally and in echelon, a separate stallway provided for each of said series of stalls or half stalls, a central working space between said stallways and divided therefrom, a pair of entrance gates for the cows at one end of the building, there being one gate for each stallway, and a pair of exit gates at the other end of the building, there being one exit gate for each stallway, the openings of the stalls of each series facing in the direction of the entrance gate leading into the stallway communicating with such series.

In testimony whereof I have signed my name to this specification in the presence of two subscribing witnesses.

WILLIAM LIVINGSTONE BOYCE.

Witnesses:
C. F. BUTLER,
D. J. BATEY.